United States Patent [19]
Grant

[11] Patent Number: 4,550,615
[45] Date of Patent: Nov. 5, 1985

[54] FLUID FLOWMETER

[76] Inventor: Graham C. Grant, P.O. Box 40, Northbridge, New South Wales 2063, Australia

[21] Appl. No.: 527,326

[22] Filed: Aug. 29, 1983

[30] Foreign Application Priority Data

Sep. 6, 1982 [AU] Australia .................. PF5752

[51] Int. Cl.[4] .................. G01F 1/20; G01F 1/66
[52] U.S. Cl. .................. 73/861.21; 73/861.39
[58] Field of Search .......... 73/861.18, 861.19, 861.21, 73/861.39, 861.71, 861.73

[56] References Cited

U.S. PATENT DOCUMENTS

| Re. 23,724 | 10/1953 | Seabert | 367/175 |
|---|---|---|---|
| 1,964,606 | 6/1934 | Thuras | 367/175 |
| 2,410,806 | 11/1946 | Black, Jr. et al. | 367/175 |
| 2,492,371 | 12/1949 | Sivian | 73/861.21 |
| 2,936,619 | 5/1960 | Gibney | |
| 3,021,708 | 2/1962 | November et al. | 73/861.18 |
| 3,329,017 | 7/1967 | Yamamoto et al. | |
| 3,580,092 | 5/1971 | Scarpa | 73/861.18 |
| 3,600,612 | 8/1971 | Beeken | 73/861.21 |
| 3,665,226 | 5/1971 | Sinker | 73/861.21 |
| 3,768,309 | 10/1973 | Hart | |
| 3,816,773 | 6/1974 | Baldwin | 73/861.21 |

FOREIGN PATENT DOCUMENTS

| 1930497 | 2/1974 | Fed. Rep. of Germany . |
|---|---|---|
| 0100309 | 6/1982 | Japan . |
| 2042190 | 9/1980 | United Kingdom . |

OTHER PUBLICATIONS

"Calibrated Electronic Listener Hears Flow and Measures It" in Product Eng. 9/22/69.
Davis et al., "A New Method for Monitoring Blood Flow in External Shunts" in Proc. on Eng. in Medicine & Biology 11/16/70 p. 279.

Primary Examiner—Herbert Goldstein
Attorney, Agent, or Firm—Ladas & Parry

[57] ABSTRACT

A flowmeter which is connectable in series with a fluid supply line and which functions to meter the rate of fluid flow through the supply line. The flowmeter incorporates a chamber into and through which fluid is passed, and an acousto-electrical transducer is located within the chamber for exposure to acoustical energy which is emitted by fluid passing through the chamber. The transducer is connected in circuit with a detector which is arranged to provide an output which follows the peak voltage of an amplified output signal generated by the transducer as a consequence of the transducer being exposed to acoustical energy of the fluid. A display device is incorporated in the flowmeter for providing a measure of the detector output, and hence of the amplitude of the transducer output, in terms of fluid flow rate.

8 Claims, 7 Drawing Figures

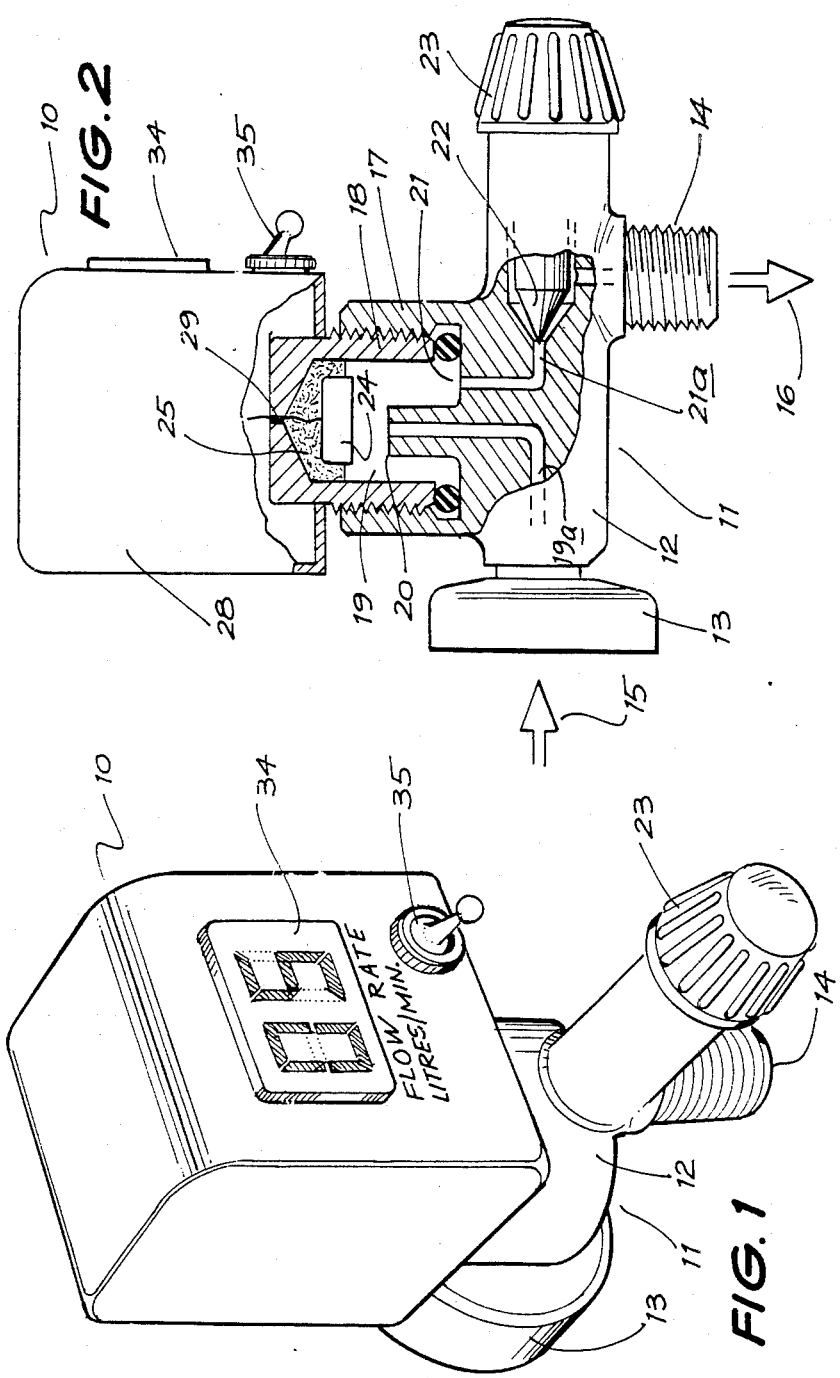

FLUID FLOWMETER

FIELD OF THE INVENTION

This invention relates to a device, hereinafter referred to as a flowmeter, which is suitable for use in metering the rate and/or volume of fluid flow through a fluid supply line.

The flowmeter has been developed primarily for measuring the flow rate of oxygen and other gases which are used in hospitals and similar situations and the invention is hereinafter described in the context of such application for convenience of reference. However, it will be appreciated that the flowmeter may be used in other environments, including in industrial applications and, indeed, that the device may be used for monitoring the flow rate of other fluids including low viscosity liquids and vapours.

BACKGROUND OF THE INVENTION

A flowmeter which is used extensively in hospitals for monitoring the flow rate of oxygen and other gases is incorporated in a fitting which is connectable to a gas supply line and which has an outlet to which a gas delivery line can be connected. The flowmeter, which is located in series with the inlet and outlet ports of the fitting, includes a vertically extending transparent tube which has a tapered bore, the bore size increasing with height of the tube, and a small ball or bobbin located within the bore of the tube. Gas which is delivered to the fitting flows upwardly through the tube and, in so doing, lifts the ball or bobbin to a height which is proportional to the flow rate of the gas. The tube is calibrated to provide a flow rate read-out (usually in liters per minute) for a given constant delivery pressure (usually 400 kPa) in accordance with the lift height of the ball or bobbin.

When used in an oxygen reticulation system, the flowmeter tube normally is located within an outer (transparent) tubular envelope, and the gas which travels up the tube passes into the outer envelope and down an annulus between the tube and the envelope to proceed toward the outlet of the fitting. Also, a valve element is incorporated in the fitting between the flowmeter and the outlet for regulating the flow rate of gas through and from the fitting.

The above described flowmeter has proved to be highly successful, at least in commercial terms, largely, so far as the inventor has been able to determine, because no acceptable alternative device has been developed. However, the flowmeter does have certain inherent deficiencies. The device must be orientated in a vertical direction when in use in order that it might provide an accurate read-out, and the upwardly projecting tube/envelope is vulnerable to breakage. Additionally, the flowmeter cannot be read from a distance and cannot conveniently be adapted to provide for remote monitoring or to provide an alarm in the event of unacceptably low flow rates.

SUMMARY OF THE INVENTION

The inventor has sought to avoid or, at least, reduce the above mentioned deficiencies by developing a fluid flowmeter which generates an electrical signal which relates to the fluid flow rate and which may be employed to drive a flow rate indicator device. Also, the flowmeter may be adapted to provide a measure of volume of fluid flow through the device. This is achieved simply by integrating the elecrical signal which provides the measure of flow rate.

Broadly defined, the present invention provides a fluid flowmeter which is connectable in series with a fluid supply line and which comprises: a chamber through which fluid is passed, an acousto-electrical transducer which is in the form of a microphone and which provides an electrical output signal when exposed to acoustical energy emitted by the fluid, and an indicator device in circuit with the transducer for providing indication of the electrical output of the transducer. The flowmeter is characterised in that the transducer is located within the chamber where it is exposed directly to fluid flowing through the chamber and to acoustical energy which is emitted by the fluid. Additionally, a diaphragm or casing portion of the transducer is apertured to permit pressure equalisation at opposite faces of the diaphragm.

The invention makes use of the phenomenon that the amplitude of sound emitted by a fluid under dynamic conditions varies with changing flow rates of the fluid. Thus, the output from the transducer will be proportional (either directly or indirectly) to the flow rate of fluid to which the transducer is acoustically exposed. The transducer responds to the existence of and changes in the acoustical energy of the fluid (i.e., to the existence of sound pressure waves), even though the transducer is exposed to pressurisation within the chamber, because the diaphragm or casing portion of the transducer is apertured to permit equalisation of background pressure at the opposed faces of the diaphragm.

The fluid may be admitted to the flowmeter in a manner such that the radiated energy is in the sonic, sub-sonic or ultra-sonic frequency range, and the expression "acoustical energy" as employed herein is to be construed as embracing sound energy which lies within or without the audible spectrum.

PREFERRED FEATURES OF THE INVENTION

Fluid admitted to the flowmeter chamber is preferably directed into the chamber by way of a nozzle or jet, and the nozzle or jet is preferably orientated such that the inflowing fluid is caused to impinge on the transducer. However, it should be understood that impingement of the fluid on the transducer is not essential, it being sufficient that the transducer be exposed to the acoustical energy of the fluid. The jet or nozzle may be of simple tubular form or it may be configured so as to induce enhanced turbulence in the inflowing fluid in order to increase the level of sound energy of the fluid flowing into the chamber. Additionally, or alternatively, the chamber itself may be configured so as to induce turbulence in the fluid. As a further alternative, the jet or nozzle may be configured so that the fluid passing into the chamber is caused to emit a substantially pure tone rather than random noise.

The flowmeter would normally incorporate an amplifier and a display device to which the output from the transducer is applied, and the display device would then present a direct read-out of the fluid flow rate. The display device may provide for an analogue or a digital display.

In order to provide for signal processing and to drive the display device, a battery and/or a photo-voltaic cell may be incorporated in the flowmeter, but, in the alternative, the flowmeter may be powered from a mains supply.

The invention can be embodied in a flowmeter unit which is compact, which provides for remote monitoring and which may incorporate provisions for emitting an alarm signal in the event that the fluid flow rate should drop below or exceed a predetermined level. Remote monitoring and alarm functions may be provided by way of a wired or a wireless link to a monitoring station.

The acousto-electrical transducer may comprise any type of transducer which responds to the presence of incident acoustical energy by generating an electrical signal which varies (e.g., in amplitude or frequency) in accordance with the sound level of the incident energy. The transducer may comprise a microphone-type device having a diaphragm which is exposed to the acoustical energy within the chamber of the flowmeter.

When in the form of a microphone, the transducer may comprise a moving coil, moving iron, capacitor, crystal, carbon, ribbon or other type of microphone, depending upon the level of sensitivity and/or degree of linearity required to meet the demands of any given application of the flowmeter.

Two electro-acoustical transducers may be incorporated in the flowmeter, one being exposed to acoustical energy in the chamber and the other being exposed to ambient acoustical energy. Then, the outputs of the two transducers may be fed in anti-phase to a common amplifier so that extraneous noise in the respective outputs is cancelled.

The invention will be more fully understood from the following description of a flowmeter device which is suitable for use in regulating and metering the flow rate of a gas such as air or oxygen. The description is given with reference to the accompanying drawings.

BRIEF DESCRIPTION OF THE DRAWINGS

In the drawings,

FIG. 1 shows a perspective view of the flowmeter,

FIG. 2 shows a partially sectioned side elevation view of the flowmeter,

DETAILED DESCRIPTION OF THE INVENTION

Figure 3:
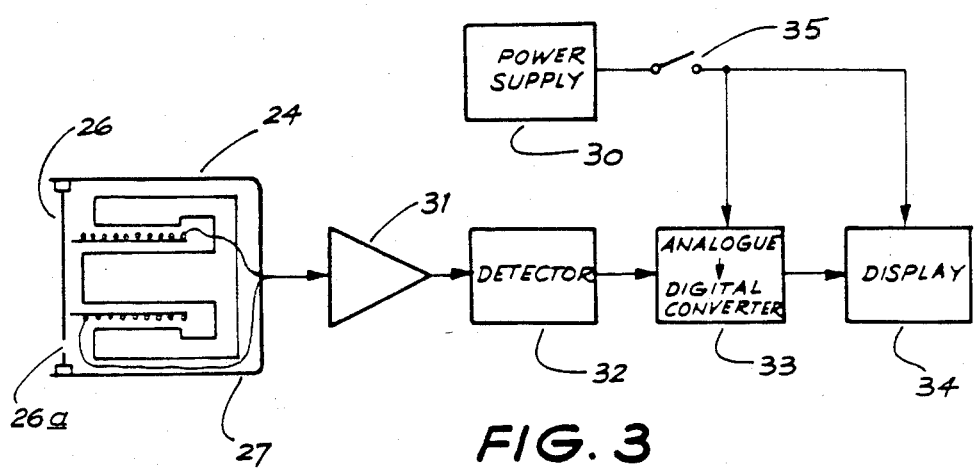
FIG. 3 shows a schematic representation of electrical circuit components which are located within an upper casing portion of the flowmeter.

As illustrated, the flowmeter comprises two interconnected (upper and lower) portions 10 and 11. The upper portion 10 may be regarded as a flow metering device and the lower portion 11 may be considered as a flow controlling device, although the two portions are interdependent.

The lower portion 11 comprises a metal body 12 which is connectable to a pressurised supply of oxygen by way of a screw coupling 13 and which is connectable to a delivery line (not shown) by way of a screwed outlet connector 14. Oxygen is directed into and from the body 12 in the directions indicated by the arrows 15 and 16.

The body portion 12 includes a recessed embossment 17, and a lower projection 18 of the metering device 10 is removably engaged within the embossment 17 by way of a screwed interconnection. Oxygen is directed into the recessed embossment and, thus, into a chamber 19 which is defined by the lower projection 18 of the metering device, by way of an inlet port 19a and a tubular nozzle 20. The nozzle 20 forms a part of the body 12 and the nozzle communicates with the screw coupling 13.

In operation of the flowmeter, oxygen passes into the chamber 19 by way of the nozzle 20, and the oxygen then flows to the outlet 14 by way of an exit port 21 and a valved orifice 21a within the body portion 11. A tapered valve member 22 is located within the body portion 12 and it is positionable relative to the orifice 21a for regulating the rate of flow of oxygen from the flowmeter.

The valve member 22 is selectively positionable by a rotatable flow control knob 23.

An acousto-electrical transducer in the form of a moving-coil microphone 24 is located within the lower projection 18 of the metering device 10 and, thus, the microphone is exposed to acoustical energy which is generated as a result of oxygen flowing into and through the chamber 19. The microphone is supported in a cushion 25 and it is orientated such that oxygen flowing from the nozzle 20 impinges on a diaphragm 26 of the microphone.

The diaphragm 26 or a rearward casing portion 27 of the microphone would normally be apertured as at 26a to provide for equalisation of static pressure on the opposed faces of the diaphragm.

The electrical output from the microphone 24 is applied to signal processing devices within a casing 28 which forms a part of the metering device 10, and wiring extends into the casing from the microphone by way of a sealed aperture 29 above the microphone.

Figure 7:
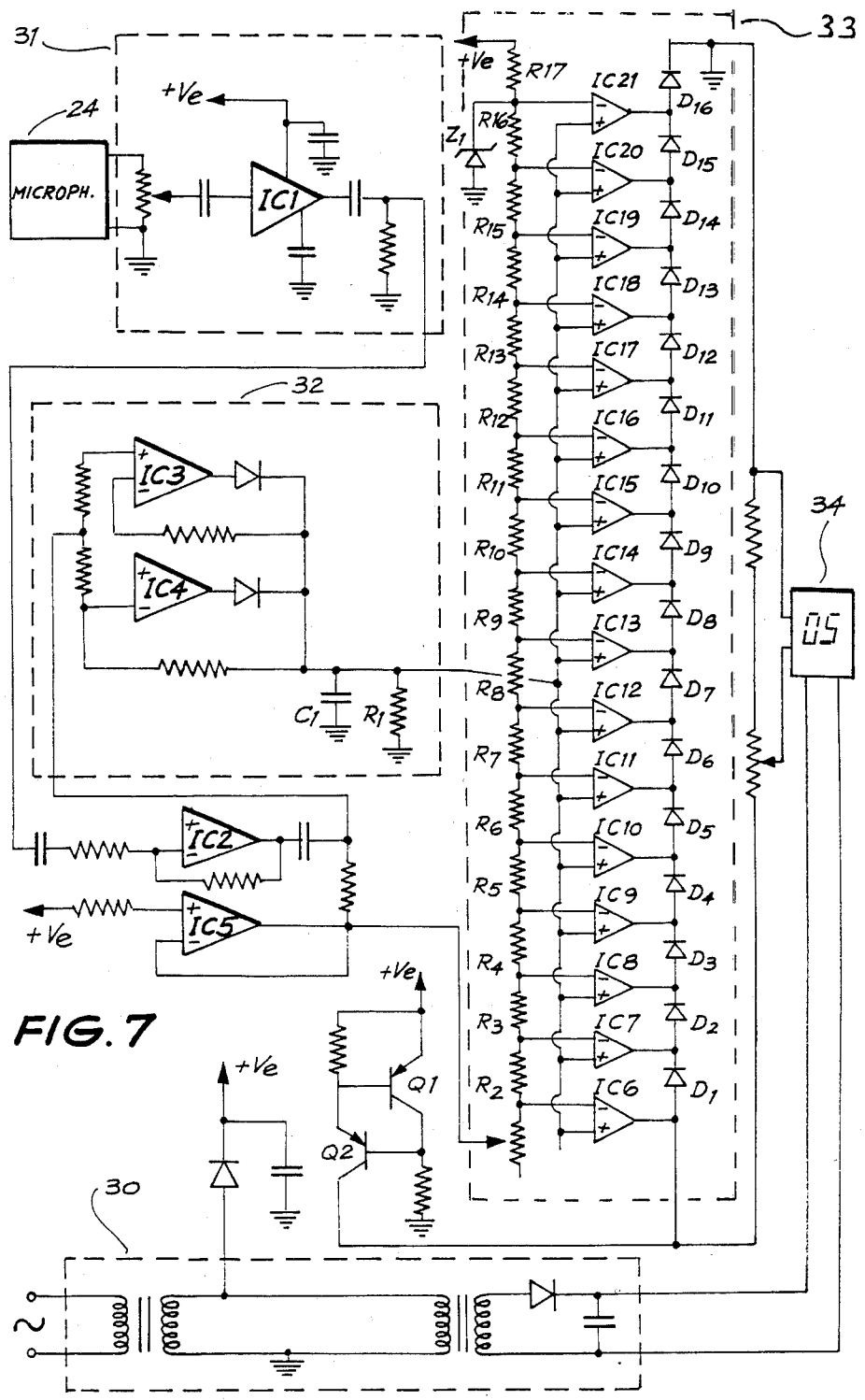
FIG. 7 shows a detailed arrangement of one (typical) form of the circuit which is illustrated schematically in FIG. 3.

The casing 28 contains rechargeable or replaceable batteries 30 (or a power supply which is connectable to a source of alternating current), an amplifier 31, a detector 32, an analogue-to-digital converter 33 and a liquid crystal or other digital display device 34. These various components are illustrated in FIGS. 3, 4 and 7, and the face of the display device is also shown in FIGS. 1 and 2.

The display device 34 may comprise a digital voltmeter or an analogue voltmeter which is calibrated to provide a reading of gas flowrate in liters per minutes or other units which are appropriate to the application of the device. Alternatively, the display device 34 may comprise an array of light emitting diodes (LED's) which are driven to illuminate progressively with increasing rates of flow of the oxygen.

The elecrical circuitry also includes a switch 35 for disabling the display device and, thus, for preserving battery life when no read-out is required. The switch may be ganged with and be actuated by rotation of the flow control knob 23. Also, although not shown, a photo-voltaic cell may be fitted to the casing for powering the unit (in which case batteries will not be required) or for charging the batteries, and additional circuit components may be included for linearising the output signal from the microphone.

Figure 4:
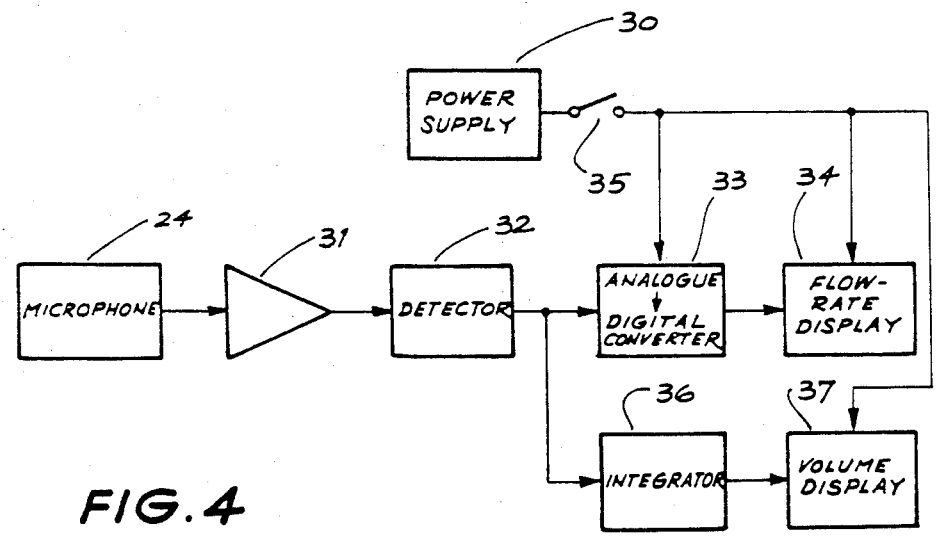
FIG. 4 shows a circuit which is similar to that shown in FIG. 3 but which also includes circuit components arranged to provide a measure and display of the volume of oxygen passed through the flowmeter.

FIG. 4 shows a circuit which may be incorporated in the flowmeter to provide a measure and display of the volume of oxygen passed through the flowmeter. Thus, in addition to the flowrate display meter, the arrangement shown in FIG. 4 includes an integrator circuit 36 which functions to integrate the output of the detector 32 with respect to time and to provide thereby an output signal which is representative of volume. The output from the integrator 36 is applied to a suitably calibrated meter 37 which is employed to display incrementally the volume of oxygen passed through the flowmeter.

The operation of the flowmeter is now described in greater detail with reference to FIGS. 5 to 7 of the drawings.

Figure 5:
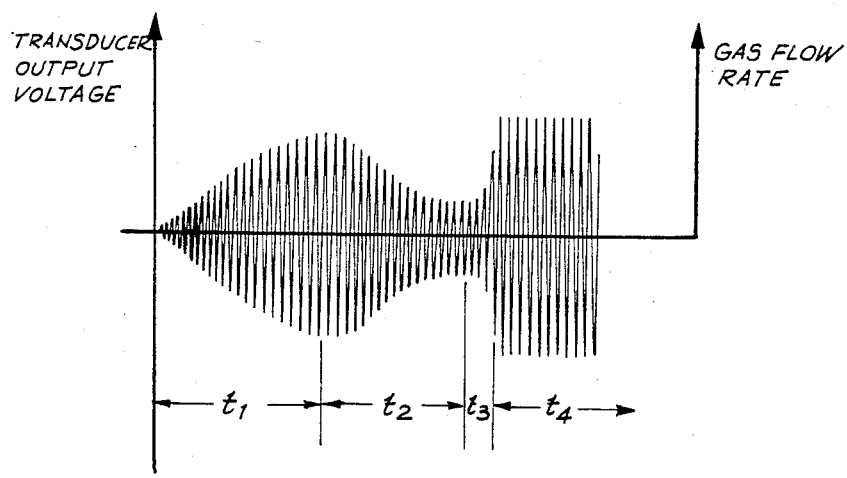
FIG. 5 shows the waveform of an (idealised) output signal from the flowmeter transducer with variation of the flow rate of oxygen through the flowmeter.

FIG. 5 shows an idealised waveform of the output signal from the transducer 24 with variation of the flowrate of oxygen through the flowmeter under substantially constant pressure conditions. The waveform is idealised in the sense that it shows a single frequency tone and a smooth envelope, whereas it is more likely in practice that the frequency of the signal will be complex and random, due to the existence of turbulence in the chamber 19, and that the envelope will not be absolutely smooth. However, the point to be noted from FIG. 5 is that the peak voltage of the transducer output rises over regions $t_1$ and $t_3$ with increasing flowrate of oxygen, that the voltage decreases over region $t_2$ with decreasing flowrate, and that the voltage remains constant over region $t_4$ with a constant flowrate of oxygen.

Therefore, when the envelope of the transducer output is detected in the diode detector 32 (in much the same way as the audio component of an amplitude modulated radio frequency signal is detected), an output signal which is proportional to the oxygen flow rate is derived from the detector.

Figure 6:
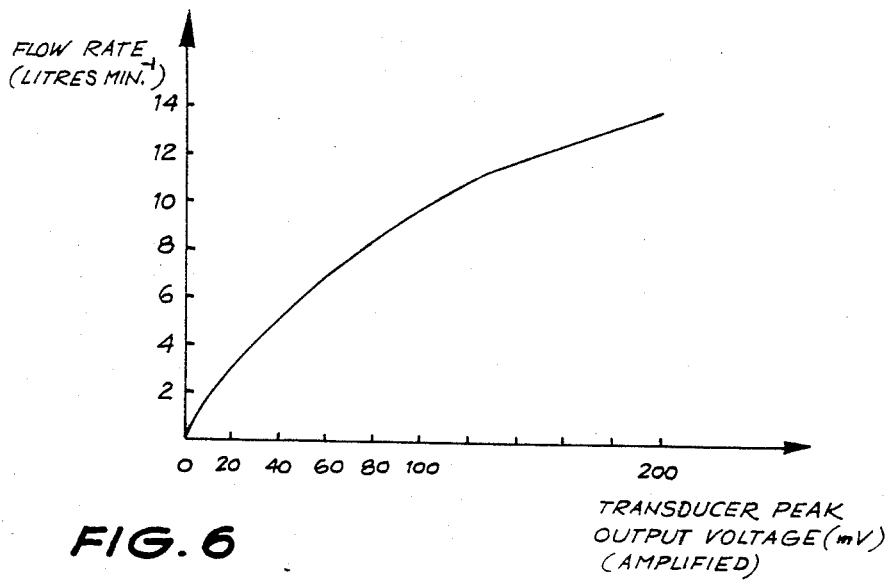
FIG. 6 is a graph which shows the relationship between the flow rate of oxygen through the flowmeter and the peak voltage (amplified) output of the transducer.

FIG. 6 shows graphically the relationship of the peak output voltage from the transducer 24 against a measured rate of flow of oxygen through the flowmeter. The output voltage (from a magnetic microphone) is plotted in millivolts, following amplification and detection of the voltage signal, and the gas flow rate is recorded in liters per minute.

As can be seen from FIG. 6, the relationship between the peak voltage (envelope) output of the transducer and the gas flow rate is not linear and, if a reasonable order of accuracy is required of the flowmeter, the output signal from the detector 32 will need to be linearised before it is applied to the display device.

Linearisation of the signal may be effected in a programmable read only memory (PROM) which may form an element in the analogue-to-digital converter 33 shown in FIGS. 3 and 4. Alternatively, the circuit may be configured as shown in FIG. 7 to effect processing, linearising and metering of the signal.

In the arrangement shown in FIG. 7 the output from the microphone 24 is applied to the amplifier 31 (IC1) and is further amplified and buffered by amplifier IC2. A positive peak voltage detector IC3 and an inverting negative peak voltage detector IC4 provide an output which represents the absolute peak level of the signal (i.e., the envelope voltage), and capacitor $C_1$ and resistor $R_1$ provide the peak hold and decay time for the detector 32. Differential amplifier IC5 provides compensation for the voltage offsets of the inputs to IC's 2, 3 and 4.

The linearising network comprises sixteen comparators IC6 to IC21, a chain of divider resistors $R_2$ to $R_{17}$ and a chain of series connected germanium diodes $D_1$ to $D_{16}$ which are supplied with a constant current from a source consisting of transistors Q1 and Q2. The output of the detector 32 (IC3 and 4) is connected to all noninverting inputs of the comparators IC6 to IC21.

The top end of the resistor divider chain is fed from a voltage supply which is stabilized by zener diode $Z_1$, and the values of the resistors $R_2$ to $R_{16}$ are selected to provide reference voltage steps appropriate to effect linearisation of the curve shown in FIG. 6. The outputs of the comparators IC6 to IC21 are via open collector transistors which are "ON" if the output voltage from the detector 32 is lower than the reference voltage at the particular comparator input, so that with zero input signal all of the comparators are turned "ON" and thus short out all of the diodes $D_1$ to $D_{15}$. However, as the output voltage from the detector rises, the comparators turn "OFF" in sequence and the resultant current flow through the diodes causes a voltage drop which appears across the digital voltmeter 34 at levels which correspond with incremental levels of the rate of flow of oxygen through the flowmeter.

In an alternative form of the above described circuit, the diodes $D_1$ to $D_{16}$ may be replaced by light emitting diodes (LED's) and the meter 34 may be omitted. Then, as the input voltage from the detector 32 rises, the comparators will turn "OFF" in sequence to allow current to flow through the LED's. Thus, as the voltage increases, a bar of light of increasing height or length will be formed to provide a (linearised) measure of the output of the transducer.

I claim:

1. A fluid flowmeter comprising a body portion, a chamber within the body portion through which fluid is passed in use of the flowmeter, first and second fluid flow channels in the body portion, the first channel being connectable at one end to a supply of fluid and communicating at its other end with a nozzle which projects into the chamber, the second channel communicating at one end with the chamber and being connectable at its other end to a fluid delivery line, an acousto-electrical transducer located within the chamber and exposed directly to fluid flowing through the chamber and to acoustical energy which is emitted by the fluid, the nozzle being orientated toward the transducer whereby fluid passing into the chamber from the nozzle is caused to impinge on the transducer, the transducer being in the form of a microphone including a vibratable member which provides an electrical output signal when exposed to acoustical energy emitted by the fluid, the vibratable member or casing portion of the transducer being apertured to permit pressure equalisation at opposite faces of said vibratable member, and an indicator in circuit with the transducer for providing indication of the electrical output of the transducer.

2. A fluid flowmeter as claimed in claim 1 wherein the transducer is connected electrically in circuit with an amplifier, with a voltage detector which is arranged to provide an output signal which follows the amplitude of the voltage output of the transducer and with display means for displaying a measure of the output signal from the detector in terms of fluid flow rate.

3. A fluid flowmeter as claimed in claim 2 wherein electric circuit components, including the amplifier, detector and display device, are located in a casing which is removably connected to the body portion, wherein the chamber within the body portion is closed by connecting the casing to the body portion, and wherein the transducer is mounted to the casing and disposed so as to locate within the chamber when the casing is connected to the body portion.

4. A fluid flowmeter as claimed in claim 1 wherein voltage linearising means are located in circuit between the detector and the display means, whereby the display means will display output voltage levels which increment linearly with corresponding incremental changes in the flow rate of fluid flowing through the flowmeter.

5. A fluid flowmeter as claimed in claim 1 and including integrating circuit means connected in circuit with the detector, and a further display means in circuit with the integrating means for displaying a measure of the output signal of the integrating means in terms of fluid volume.

6. A fluid flowmeter as claimed in claim 1 wherein an adjustable flow control valve is located in the second fluid flow channel for regulating the rate of fluid flow through the flowmeter.

7. A fluid flowmeter which is connectable in circuit with a fluid supply line and which comprises a body portion, a chamber within the body portion and through which fluid is passed in use of the flowmeter, first and second fluid flow channels in the body portion, the first channel being connectable at one end to a supply of fluid and communicating at its other end with the chamber, the second channel communicating at one end with the chamber and being connectable at its other end to a fluid delivery line, an acousto-electrical transducer located within the chamber and exposed directly to fluid flowing through the chamber and to acoustical energy which is emitted by the fluid in passing into the chamber from the first channel, the transducer being in the form of a microphone including a vibratable member which provides an electrical output signal when exposed to acoustical energy emitted by the fluid, the vibratable member or casing portion of the transducer being apertured to permit pressure equalisation at opposite faces of said vibratable member, and an indicator in circuit with the transducer for providing indication of the electrical output of the transducer.

8. A fluid flowmeter for location in series with a fluid supply line and which comprises a body portion, a chamber within the body portion and through which fluid is passed in use of the flowmeter, first and second fluid flow channels in the body portion, the first channel being connectable at one end to a supply of fluid and communicating at its other end with the chamber, the second channel communicating at one with the chamber and being connectable at its other end to a fluid delivery line, an adjustable flow control valve in the second channel for regulating the rate of fluid flow through the flowmeter, an acousto-electrical transducer located within the chamber and exposed directly to fluid flowing through the chamber and to acoustical energy which is emitted by the fluid in passing into the chamber from the first channel, the transducer being in the form of a microphone including a vibratable member which provides an electrical output signal when exposed to acoustical energy emitted by the fluid, the vibratable member or casing portion of the transducer being apertured to permit pressure equalisation at opposite faces of said vibratable member, and an indicator in circuit with the transducer for providing indication of the electrical output of the transducer.

* * * * *